D. A. HOPKINS.
Car-Axle Box.

No. 19,424.                Patented Feb. 23, 1858.

UNITED STATES PATENT OFFICE.

DAVID A. HOPKINS, OF PATERSON, NEW JERSEY.

IMPROVEMENT IN JOURNAL-BOXES.

Specification forming part of Letters Patent No. 19,424, dated February 23, 1858.

*To all whom it may concern:*

Be it known that I, DAVID A. HOPKINS, of Paterson, in the county of Passaic and State of New Jersey, have invented certain Improvements in Journal-Boxes, the construction and operation of which I have described in the following specification and illustrated in the accompanying drawings with sufficient clearness to enable competent and skillful workmen in the arts to which it pertains or is most nearly allied to make and use my invention.

My said improvements consist, first, in providing the housing with a diaphragm in the manner hereinafter described to prevent the ingress and egress of air into and out of the housing, as set forth; second, the combination of a boss or its equivalent upon the axle with its location inside of the housing and the feeding of the oil only to that portion of the axle not between the packing and the boss, as set forth, said boss being formed by turning a recess in the axle or by any other convenient means; third, a movable stuffing-box surrounding the axle and kept up to the side of the housing by pressure, as hereinafter set forth; fourth, the combined construction and arrangement of the bearing brass or box and its casing, by which the bearing is secured more effectually, the friction of the axle is reduced without reducing its security in its bearing, the article is made less expensive in construction, and capable of being worn entirely out, except the flanges which hold it in place.

Figure 1:
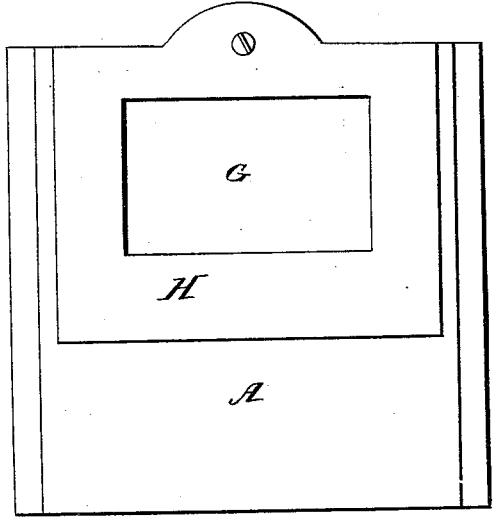
Figure 2:
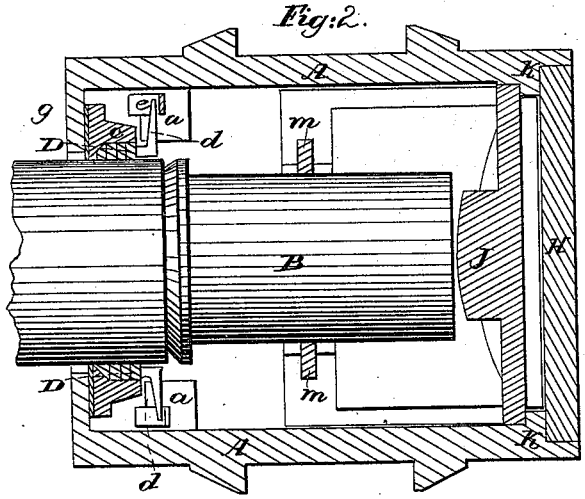
Figure 3:
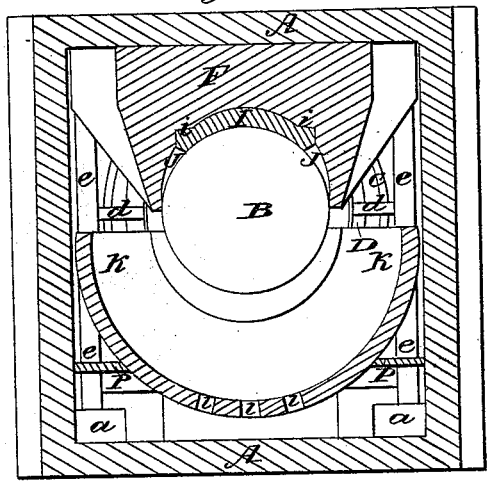
Figure 4:
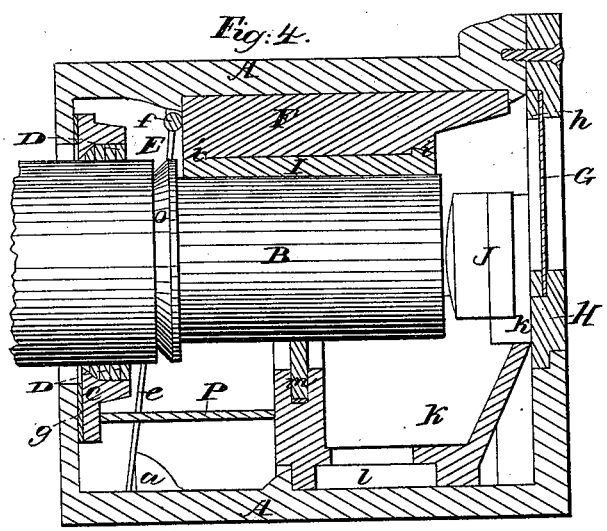

In the accompanying drawings, Figure 1 is an end elevation of the apparatus, showing the housing and movable diaphragm. Fig. 2 is a horizontal section showing the end of the axle entire and the other parts that lie below the center of said axle. Fig. 3 is a vertical transverse section showing the parts at the left hand of the line X X in Figs. 2 and 4. Fig. 4 is a vertical longitudinal section showing the parts beyond the axle, the axle or journal, and also the plate or bearing to prevent end play, being shown entire.

A is the housing, which is made of cast-iron or other suitable material and with the usual opening for the insertion of the axle B, said opening being large enough to allow the axle the necessary play. This opening is closed around the journal by the movable stuffing-box C. This stuffing-box is made tight around the axle by packing-rings or a gasket kept in place by the follower D, which is kept up to the packing by the spring-pressure of the bar E pressing against the arms $d\ d$ of the follower. This bar E is composed of two side pieces $e\ e$ and a cap piece $f$, which connects the pieces $e\ e$ at the upper end. The ends of $e\ e$ are kept in place at the bottom by projections $a\ a$, which rise from the bottom of the housing for that purpose, and at the top the bar $f$ is secured by the box or casing F. This bar E not only keeps the packing tight around the axle, but also holds the stuffing-box C up to the side of the housing. The stuffing-box is made smooth on the side toward the housing, and a piece of leather or other suitable lining $g$ is secured to the inside of the housing, so as to form a perfectly tight joint between the stuffing-box and the housing, and the surfaces thus in contact being flat and plain the vibrations of the axle do not derange their contact so as to cause a leak. The objects of this device being to exclude the dust from the box and to prevent the circulation of air through it, it is clear that any leak in any part of the housing, and also that the end play of the axle alternately filling and vacating space in the housing, would have a tendency to produce a constantly-vibrating current of air into and out of the housing, which might render any possible imperfection in the packing or other fittings highly injurious. To remedy this defect I provide the housing with a flexible diaphragm G, secured in the removable end plate H by the parallelogram $h$, secured to the plate H by screws or otherwise, as may be convenient. A piece of closely-woven cloth answers well for the diaphragm. The flexibility of this diaphragm allows it to vibrate enough to compensate for the difference of space in the housing caused by the end play of the axle, and by this means any great pressure of air in either direction is avoided.

F is that part of the journal-box which forms the backing or casing for the bearing-brass. Its upper side is fitted to the housing, and its under side is so formed as to fit the axle when the bearing-brass is worn away or removed, which arrangement allows the bearing-brass to be entirely worn away, except the flanges which hold it in place. To accomplish this purpose these ledges $i\ i$ are beveled from the outer boundary of the bearing-brass inward, which secures the outer portions of the brass as well as those more internally located, the ledges by this means extending to the extreme outer portion or boundary of the bearing. The box F comes well down the sides of the journal to secure it in place. This back part or body F of the box is channeled, as shown in Figs. 3 and 4, to receive the projections $i\,i$ of the bearing-brass I, which projections are so made that if the brass should be broken the pressure of the journal upon them will still crowd the outer pieces into place and no piece can escape.

When the car is running under ordinary conditions, the pressure should be almost entirely upon the top of the axle. Any considerable friction upon its side is then injurious. It is, however, necessary to have side bearings for occasional use—as, for instance, when the brakes are applied or the wheels strike an obstruction. The journal would otherwise be forced from its position. These side bearings being, however, only for occasional use and not for general service, need not be made of a metal having any very great anti-friction properties, and, as it should never touch the journal at any other time, it is not worn away so as to require to be replaced. For this reason the bearing-brass or anti-friction lining of the box only occupies a small portion of the circle around the journal, said journal being supported against occasional extreme side pressure by the backing F, in which the lining is secured, the lower portion of said backing coming nearly against the sides of the journal for that purpose. A cavity $j$ is left between the journal, the box or backing F, and the bearing-brass, as shown, so that there shall be no friction on the journal at that point. The bearing-brass is completely supported in all parts by the backing F.

The end play of the axle is restricted by the stop-bar J, which is supported by a ledge $k$, cast upon the housing.

K is a waste-box, which should be filled with waste to supply oil from the bottom of the housing to the axle. The oil is admitted into it through the openings $l\,l$. A recess is cast in the inner end of the waste-box K, into which a piece of leather $m$ is inserted, which fits the journal to prevent the escape of the waste to the inner part of the housing, where it would be likely to supply oil to the axle beyond the recess in the axle at O, and thus cause it to work out through the stuffing-box. The leather $m$ is kept up to the axle by a spring $n$. There is a recess turned in the axle at O to prevent any oil from working back upon it to the stuffing-box. This recess never passes so far out as the stuffing-box.

P is a plate supported above the oil upon ledges on the side of the housing to prevent any sudden motion of the box dashing oil upon the axle.

I am aware that various arrangements and constructions of ledges and flanges, both internal and external, have been used to secure the anti-friction metal in its casing or backing, and that various forms and sizes of bearings have been used, some of which occupy a no greater portion of the circle around the journal than mine; but I am not aware that in any case the ledges for retaining the bearing have been so constructed as to completely surround said bearing extending to its extreme edge in such a manner as to secure all parts of its borders from escape should they be broken. Neither am I aware that in any case the combined construction of the anti-friction metal and backing has been such as to give a narrow bearing of the anti-friction metal or lining upon the top of the axle, while at the same time a contingent or occasional side bearing was furnished by the backing, as herein described and shown, or that in any case that side of the backing which is next the axle has been so made as to fit it, and thus allow the bearing metal to be completely worn away, with the exception of the ledges used for keeping it in place.

The particular improvements which constitute my said invention, and which I claim as having been originally and first invented by me, are—

1. Providing the housing with a diaphragm, as described, or in manner equivalent, to prevent or nearly destroy the formation of currents of air caused by the end play of the axle into and out of the housing.

2. The combination of a boss or its equivalent upon the axle with its location inside of the housing and the feeding of the oil only to that portion of the axle not between the packing and the boss, as set forth, said boss being formed by turning a recess in the axle or by any other convenient means.

3. Combining with the housing a movable stuffing-box, which surrounds the journal and may be moved with it without opening a passage for air or dust into the housing, the parts being combined, arranged, and operating substantially as set forth, for the purposes stated.

4. The combination of the backing F with the bearing-brass I, when both are constructed and combined substantially as described, for the purposes stated.

D. A. HOPKINS.

Witnesses:
JOHN CRUMLY,
THOS. P. HOW.